Feb. 13, 1940.  B. VAN ZEELAND ET AL  2,190,300
FARM WAGON
Filed April 11, 1938

Inventors.
Leonard Van Zeeland
and Bernard Van Zeeland

By

Attorneys.

Patented Feb. 13, 1940

2,190,300

UNITED STATES PATENT OFFICE 2,190,300

FARM WAGON

Bernard Van Zeeland and Leonard Van Zeeland, Kaukauna, Wis.

Application April 11, 1938, Serial No. 201,366

1 Claim. (Cl. 280—143)

This invention appertains to vehicles, and more particularly to an improved farm wagon.

One of the primary objects of our invention is to provide an all-metal built-up farm wagon which will give an exceptionally high clearance for the size of wheels employed, whereby to facilitate the use thereof in loading hay and the like.

Another salient object of our invention is to provide an easy-running all-metal farm wagon which can be easily pulled by either draft animals or a tractor, and which is of such a character that the same will readily track behind a pulling vehicle.

A further important object of our invention is to provide an all-metal farm wagon or truck, which can be easily and quickly adjusted as to length, and which embodies a telescoping draft tongue or pole to permit the wagon to be either drawn from a tractor or by draft animals.

A still further object of our invention is to provide a farm wagon of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawing, in which drawing:

Figure 1:
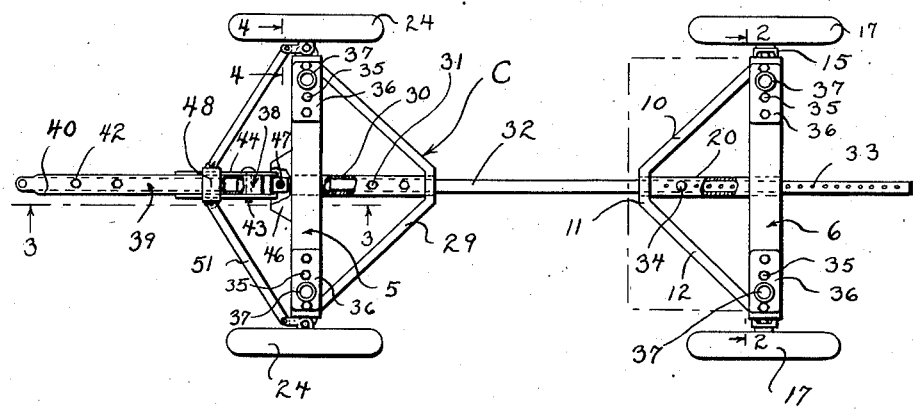
Figure 1 is a top plan view of the chassis or running gear of a farm wagon constructed in accordance with my invention, parts of the view being shown broken away and in section.
Figure 2:
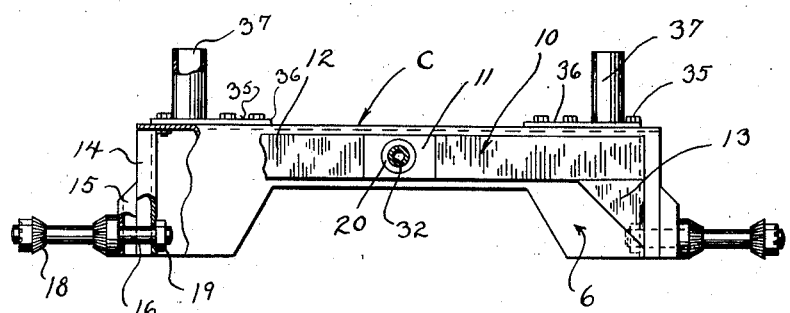
Figure 2 is a transverse sectional view taken substantially on the line 2—2 of Figure 1, looking in the direction of the arrows, and illustrating the construction of the rear bolster, the wheels being shown removed from the stub axles.
Figure 3:
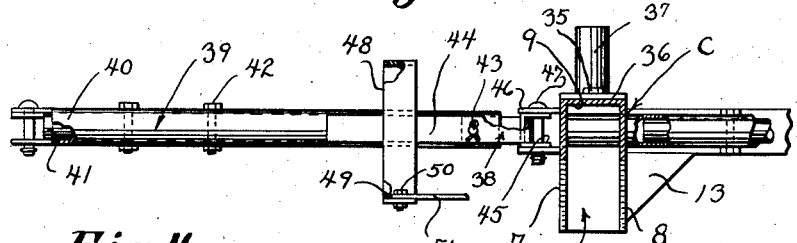
Figure 3 is a fragmentary, longitudinal sectional view taken substantially on the line 3—3 of Figure 1, looking in the direction of the arrows.
Figure 4:
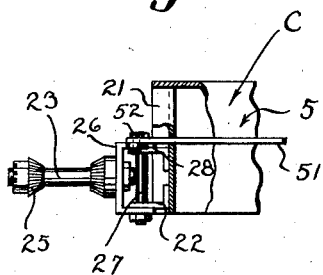
Figure 4 is a fragmentary, detail sectional view illustrating the construction and arrangement of the front bolster, the view being taken substantially on the line 4—4 of Figure 1, looking in the direction of the arrows.
Figure 4:
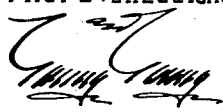

Referring to the drawing in detail, wherein similar reference characters designate corresponding parts throughout the several views, the letter C generally indicates the chassis or running gear of my improved farm wagon, and, as shown, the same embodies a front bolster 5 and a rear bolster 6. Both of these bolsters 5 and 6 are formed from a blank of sheet metal, such as steel, and are bent into shape to form a substantially inverted U-configuration in cross-section. Thus, each bolster includes spaced parallel front and rear walls 7 and 8 and a connecting top wall 9.

The rear bolster 6 has welded thereto adjacent its opopsite ends the forwardly projecting brace bar 10, which can be formed from U-shaped channel iron. This brace 10 includes the centrally disposed body portion 11 and the oppositely diverging arms 12, the terminals of which are welded to the front wall of the rear bolster, as heretofore stated. In order to give the brace 10 and the bolster 6 additional strength, triangular-shaped brace plates 13 are welded to the ends of the brace and to the front face of the bolster 6.

The ends of the rear bolster are closed by U-shaped channel irons 14, which are also firmly welded in place. These channel irons 14, in turn, have welded thereto relatively short sections of channel iron 15. These channel iron sections 14 and 15 support the stub axles 16 for the rear wheels 17, and roller bearings 18 are preferably carried by said stub axles. The inner ends of the stub axles are passed through openings formed in the channel iron sections 14 and 15, and the axles are held in place by nuts 19.

The central portion 11 of the brace 10 and the central portion of the rear bolster are provided with alined openings in which is fitted the tubular guide sleeve 20. This guide sleeve can be formed from a length of metal pipe, if so desired, and the same is firmly welded to the brace and to the bolster.

The front bolster 5 also has its terminals closed by U-shaped channel iron sections 21, which are securely welded in place. Firmly welded to the channels 21 are brackets or pivot ears 22, which hingedly support the swinging stub axles 23 for the front wheels 24. The front axles also carry suitable anti-friction bearings 25, which are preferably of the roller bearing type. The front stub axles 23 are securely bolted to a U-shaped bracket 26, which straddles the pivot ears 24, and a hinge pin or bolt 27 extends through the bracket 26 and the pivot ears 22. Each of the brackets 26 for the swinging stub axles has formed thereon or secured thereto steering crank-arms 28.

The rear face of the front bolster 5, adjacent its opposite ends, has securely welded thereto a rearwardly extending brace bar 29, which is also preferably formed from a U-shaped channel iron. This brace bar 29 and the front bolster have formed therein centrally disposed and axially alined openings into which is fitted the tubular guide sleeve 30. The guide sleeve is securely welded to the bolster and the brace bar, and can be formed from a length of metal pipe.

Securely bolted in the guide sleeve 30, as at 31, is the rearwardly directed reach pole 32. This reach pole is also formed from metal and is of a hollow construction, and hence can be formed from a length of pipe.

The rear end of the reach pole is slidably mounted in the sleeve 20 and is provided with a plurality of spaced openings 33, any one of which is adapted to aline with an opening in the guide sleeve 20. A removable pin 34 is passed through selected openings, so as to hold the reach pole in an adjusted position on the sleeve 20.

The front and rear bolsters 5 and 6 have securely bolted to their upper faces, as at 35, plates 36, which carry tubular sockets 37 for the reception of wagon body stakes of the desired height.

The front bolster 5 carries the draft appliance 38, which includes a telescoping draft tongue or pole 39. This tongue or pole includes an outer section 40 and an inner sliding section 41. The sections are held in an adjusted position relative to one another by bolts 42, which are passed through openings in said sections.

The rear end of the outer pole section 40 has pivotally connected thereto, by a transversely extending pivot pin 43, a rearwardly directed U-shaped strap. The rear end of the strap, in turn, has welded thereto a U-shaped bracket 44, which is received between upper and lower horizontally disposed plates 46, which are welded to the front face of the bolster 5. The vertically disposed pivot pin 47 is passed through the plates 46 and the arms of the U-shaped bracket 45. By this arrangement and construction, the draft tongue 39 can swing both in a horizontal plane and in a vertical plane, in view of the fact that the pivot members 43 and 47 are disposed at right angles to one another.

The U-shaped strap 44 has welded thereto an inverted U-shaped guide strap 48, which serves as means for confining the pole 39 during the swinging thereof in a vertical plane. The lower end of the guide strap 48 is provided with laterally extending pivot ears 49, to which are pivotally connected by means of bolts 50 the steering or drag-links 51. The rear ends of the drag-links 51 are pivotally connected to the crank-arms 28 by means of pivot bolts 52.

When the pole 39 is swung to the right or left, the front wheels 24 will be swung therewith, and, thus, the vehicle will readily track behind a pulling vehicle, such as a tractor.

When the pole 39 is in its extreme telescoped position, the same can be used for connecting the farm wagon to a tractor, and when the inner section 41 of the pole is pulled outwardly to its extended position, the pole can be used as an ordinary wagon tongue, whereby the wagon can be pulled by draft animals.

From the foregoing description it can be seen that we have provided an exceptionally rugged and durable form of farm wagon chassis, which can be used to the best advantage for farm purposes.

Changes in details may be made without departing from the spirit or the scope of our invention, but what we claim as new is:

An all-metal vehicle bolster comprising, a body of an inverted U-shape in cross section including spaced parallel depending side walls and a connecting top wall, vertically disposed channel beams secured between the depending side walls and closing the ends of the body, said channel beams constituting axle-supporting members, brace bars formed from channel beams secured to the outer face of one depending side wall of the body, and a guide sleeve securely fastened to the body and brace and connecting said brace to the body.

BERNARD VAN ZEELAND.
LEONARD VAN ZEELAND.